United States Patent [19]
Hayakawa et al.

[11] Patent Number: 5,229,903
[45] Date of Patent: Jul. 20, 1993

[54] MAGNETIC HEAD WITH INCLINED CORE

[75] Inventors: Yuichi Hayakawa, Tokyo; Atsushi Hirano, Gunma, both of Japan

[73] Assignee: NEC Corporation, Tokyo, Japan

[21] Appl. No.: 654,449

[22] Filed: Jan. 25, 1991

[30] Foreign Application Priority Data

Jan. 26, 1990 [JP] Japan .................. 2-16999

[51] Int. Cl.$^5$ .............. G11B 5/265; G11B 5/60; G11B 5/127
[52] U.S. Cl. .................. 360/121; 360/103; 360/118; 360/125
[58] Field of Search ............... 360/118, 119, 121, 122, 360/125, 126, 103, 57, 66

[56] References Cited

U.S. PATENT DOCUMENTS

| | | | |
|---|---|---|---|
| 3,582,571 | 6/1971 | Sprott et al. | 360/118 |
| 3,946,440 | 3/1976 | Saito | 360/118 |
| 4,316,227 | 2/1982 | Lemke et al. | 360/121 |
| 4,334,252 | 6/1982 | Toriu | 360/121 |
| 4,367,505 | 1/1983 | Stromsta et al. | 360/118 |
| 4,472,752 | 9/1984 | Lalesse | 360/121 |
| 4,607,305 | 8/1986 | Milo | 360/125 |
| 4,652,955 | 3/1987 | Niwa et al. | 360/121 |

FOREIGN PATENT DOCUMENTS

| | | | |
|---|---|---|---|
| 62-67714 | 3/1987 | Japan | 360/118 |
| 2-9007 | 1/1990 | Japan | 360/118 |
| 2-46511 | 2/1990 | Japan | 360/118 |
| 3-214409 | 9/1991 | Japan | 360/118 |

Primary Examiner—Stuart S. Levy
Assistant Examiner—Jefferson Evans
Attorney, Agent, or Firm—Sughrue, Mion, Zinn, Macpeak & Seas

[57] ABSTRACT

The structure of a magnetic head for use in a disk drive has an erase core and a read/write core which are inclined to a track of a floppy disk or disket. An erase gap and a read/write gap formed in the erase core and read/write core, respectively, each is inclined by a different angle to the longitudinal axis of the magnetic head. A shield plate is interposed between the two cores for magnetically shielding them from each other. With this configuration, the magnetic head reduces crosstalk ascribable to flux picked up by the erase core from the track.

6 Claims, 3 Drawing Sheets

MAGNETIC HEAD WITH INCLINED CORE

BACKGROUND OF THE INVENTION

The present invention relates to a magnetic head for writing and reading data out of a magnetic recording medium as well as for erasing the data on the medium and, more particularly, to a magnetic head for use in a disk drive which uses a floppy disk or disket as a recording medium.

In parallel with the increase in the capacity of a disk drive, there is an increasing demand for diskets having great coercive forces, i.e., high densities. The current trend in the disk drive art is, therefore, toward diskets having smaller track widths. An erasure-precedent type magnet head is a recent achievement that implements a sufficient overwriting characteristic in relation to such a disket. For this type of magnetic head, a reference may be made to Toshiba Review, Vol. 43, No. 11, page 887.

The erasure-precedent type magnetic head has a pair of sliders for causing a disket to slide. An erase core is held between the sliders such that it extends in parallel to a track of a disket. The erase core has an erase gap extending perpendicular to the track in close proximity to one end thereof. A read/write core is held between the sliders in the same positional relation to the track as the erase core. A read/write gap is formed in the vicinity of one end of the read/write core and, like the erase gap, extends perpendicular to the track. When the head is in a write mode, the erase gap effects DC erasure on the track while the read/write gap writes data in the so erased track.

A prerequisite with the above-described type of magnetic head is that the distance between the erase gap and the read/write gap be reduced to reduce the track width as stated above. Specifically, it is necessary to locate the gaps of the individual cores in close proximity to each other at opposite sides of the position where the cores are connected to each other. This brings about a problem that each core cannot achieve a sufficient magnetic path since part thereof exists between the two gaps. During a read mode operation, the erase gap picks up data or flux from a track of interest before the read/-write gap picks it up, resulting in the flux leaking to the read/write head as noise. The noise is propagated to the magnetic circuit of the read/write gap to critically lower the S/N ratio of signals read out. To reduce crosstalk ascribable to the erase gap, a shield may be used to prevent the noise from reaching the read/write core. In practice, however, providing such a shield is not easy and would not offer a satisfactory result. While the erase gap may be provided with an azimuth, as disclosed in Japanese Patent Laid-Open Publication No. 192004/1989 by way of example, this kind of scheme would need a complicated structure and a great number of difficult fabricating steps.

SUMMARY OF THE INVENTION

It is therefore an object of the present invention to provide a magnetic head for a disk drive which reduces crosstalk caused by an erase gap during a read mode operation.

It is another object of the present invention to provide a generally improved magnetic head for a disk drive.

In a magnetic head comprising a read/write core member having an elongate read/write gap for writing and reading data out of a track of a magnetic recording medium, and an erase core having an elongate erase gap which precedes the read/write gap to erase the track, the read/write core member and erase core member adjoin and extend parallel to each other. The two core members are inclined by a predetermined angle relative to the longitudinal axis of the magnetic head where it is parallel to the track and each has a particular width such that the read/write gap and erase gap associated therewith are substantially in line in the direction of the longitudinal axis such that they substantially cover the track to write or read data out of the medium or to erase data on the medium.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
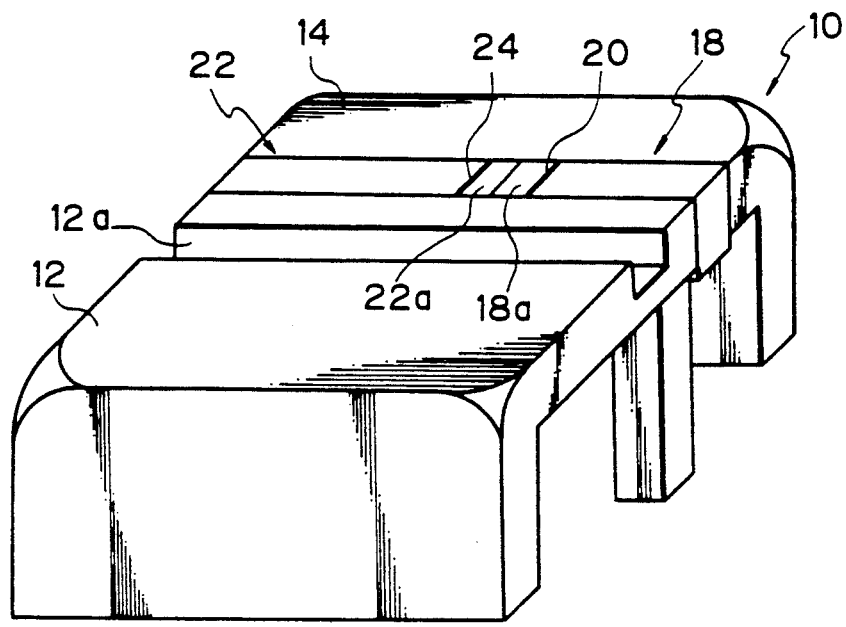
FIG. 1 is a perspective view of a conventional erasure-precedent magnetic head.
Figure 2:
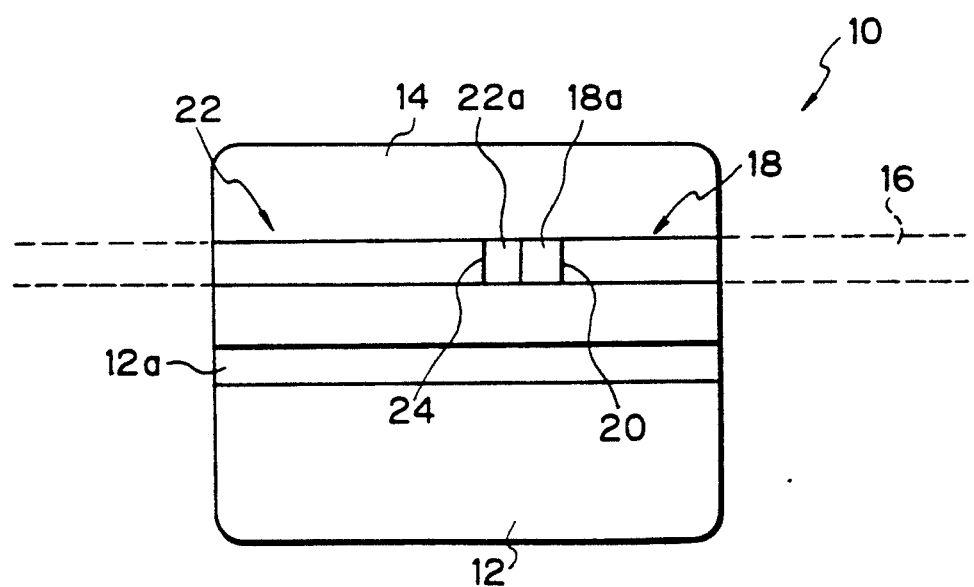
FIG. 2 is a plan view of the magnetic head shown in FIG. 1.

To better understand the present invention, a brief reference will be made to a conventional erasure-precedent type magnetic head, shown in FIGS. 1 and 2. As shown, the magnetic head, generally 10, has a pair of sliders 12 and 14 for causing a disket, not shown, to slide. An erase core 18 is held between the sliders 12 and 14 such that it extends in parallel to a track 16 formed in a disket. The erase core 18 has an erase gap 20 extending perpendicular to the track 16 in close proximity to one end 18a thereof. A read/write core 22 is held between the sliders 12 and 14 in the same positional relation to the track 16 as the erase core 18. A read/write gap 24 is formed in the vicinity of one end 22a of the read/write core 22 and, like the erase gap 20, extends perpendicular to the track 16. The slider 12 has an elongate groove 12a which is also parallel to the track 16. Before the head 10 writes data in the track 16 of a disket, the erase gap 20 of the erase core 18 effects DC erasure on the track 16. The read/write gap 24 of the read/write core 22 writes data in the so erased track 16. The erase gap 20 and the read/write gap 24 are positioned in close proximity to and parallel to each other with the intermediary of the ends 18a and 22a of the cores 18 and 22, as illustrated. Such a configuration gives rise to some problems, as stated earlier. Specifically, the cores 18 and 22 cannot achieve sufficient magnetic paths. While the head 10 is in a read mode, the erase gap 20 of the erase core 18 picks up magnetic flux from the track 16 to cause crosstalk and thereby critically degrades the S/N ratio of signals read out.

Figure 3:
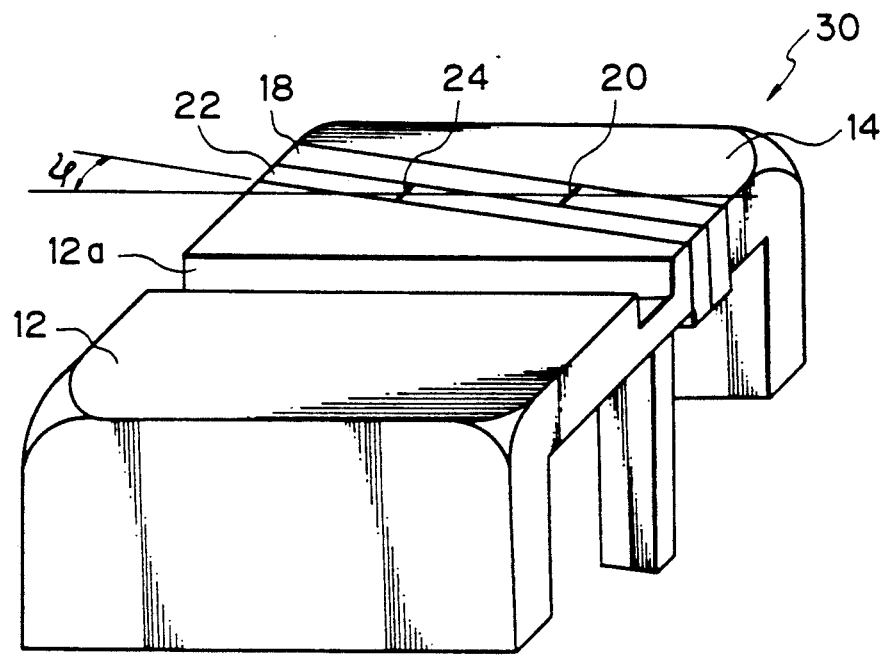
FIG. 3 is a perspective view showing an erasure-precedent magnetic head embodying the present invention.
Figure 4:
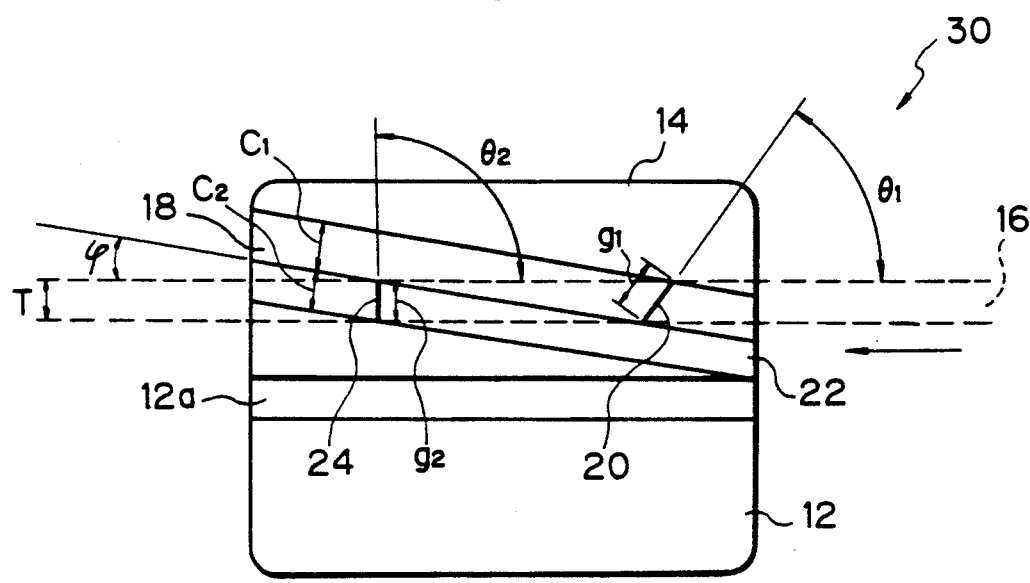
FIG. 4 is a plan view of the illustrative embodiment.

Referring to FIGS. 3 and 4, an erasure-precedent magnet head embodying the present invention is shown which is free from the problems discussed above. In the figures, the same or similar components and structural elements are designated by like reference numerals, and redundant description will be avoided for simplicity. As shown, the magnetic head, generally 30, has a pair of sliders 12 and 14, and an erase core 18 and a read/write core 22 which are held between the sliders 12 and 14. The erase core 18 and the read/write core 22 have an erase gap 20 and a read/write gap 24, respectively. The slider 12 has a groove 12a extending parallel to a track 16 of a disket, not shown. The cores 18 and 22 are inclined by an angle of $\phi$ to the groove 12a of the slider 12, i.e., relative to the longitudinal axis of the magnet head. Therefore, if the widths C1 and C2 of the cores 18 and 22, respectively, are adequately selected, then the cores 18 and 22 each fully overlaps the track 16 in at least one portion thereof. The erase gap 20 and the read/write gap 24 have respectively lengths g1 and g2, and each is positioned in the portion of the associated core 18 or 22 that fully overlaps the track 16. In this configuration, when the widths C1 and C2 of the cores 18 and 22 are different from each other, the gaps 20 and 24 will be respectively inclined by angles $\theta 1$ and $\theta 2$ to the longitudinal axis which are different from each other. Specifically, assume that the width T of the rack 16, the angle $\theta 1$ of the erase gap 20 to the longitudinal axis, the angle $\theta 2$ of the read/write gap 24 to the longitudinal axis, and the angle $\phi$ of the cores 18 and 22 relative to the longitudinal axis are predetermined for design reasons. Then, in order for the lengths g1 and g2 of the gaps 20 and 24, respectively, to cover the width T of the track 16, they should be selected as given by:

$$g1 = \frac{T}{|\sin \theta 1|}$$

$$g2 = \frac{T}{|\sin \theta 2|}$$

The widths C1 and C2 of the erase core 18 and read/write core 22 which are dependent on the lengths g1 and g2 are expressed as:

$$C1 = g1 \cdot \cos \phi = \frac{T \cdot \cos \phi}{|\sin \theta 1|}$$

$$C2 = g2 \cdot \cos \phi = \frac{T \cdot \cos \phi}{|\sin \theta 2|}$$

Regarding the angles $\theta 1$ and $\theta 2$, the difference $|\theta 1 - \theta 2|$ has to be so determined as to insure a sufficient azimuth loss. On the other hand, the distance between the erase gap 20 and the read/write gap 24 increases with the decrease in the angle $\phi$ and decreases with the increase in the angle $\phi$. Therefore, among the angles $\theta 1$, $\theta 2$ and $\phi$, the angle $\phi$ is determined on the basis of the distance between the gaps 20 and 24, and the angles $\theta 1$ and $\theta 2$ are determined on the basis of a target azimuth loss.

Figure 5:
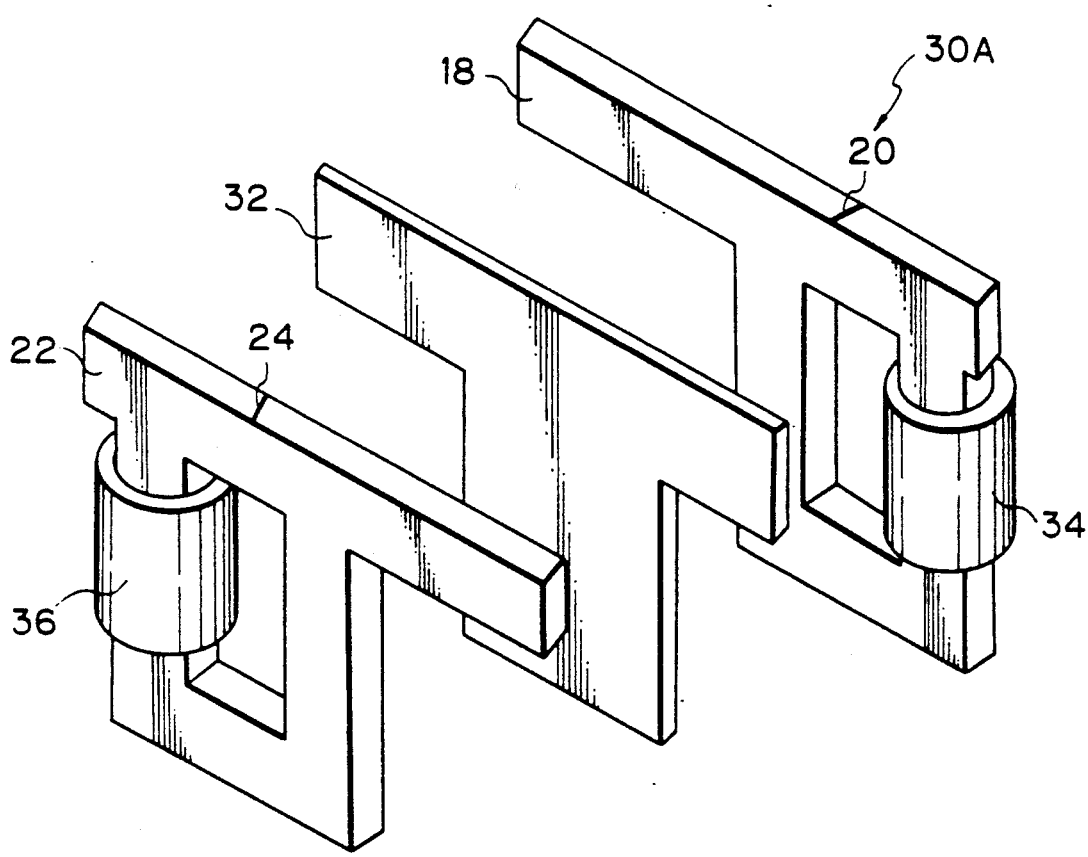
FIG. 5 is an exploded perspective view of a modified form of the embodiment.
Figure 6:
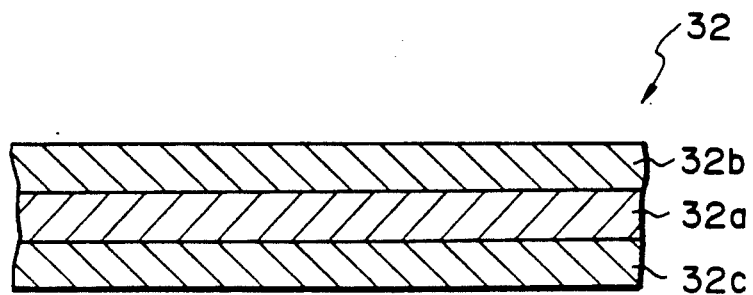
FIG. 6 is a section of a shield plate included in the modification shown in FIG. 5.

FIG. 5 is an exploded perspective view of a modified form of the magnetic head 30, the sliders 12 and 14 being not shown for clarity. The modified magnetic head, generally 30A, has a shield plate 32 intervening between the erase core 18 and the read/write core 22 for magnetically shielding them from each other. As shown in FIG. 6, the shield plate 32 is a laminate made up of a highly permeable layer 32a made of Ferrite or similar material, and non-magnetic layers 32b and 32c holding the layer 32a therebetween. With this configuration, the shield plate 32 prevents flux, or noise, picked up by the erase core 18 from the track 16, FIGS. 3 and 4, from leaking to the read/write core 22. In FIG. 5, the reference numerals 34 and 36 designate an erase coil and a read/write coil, respectively.

In summary, it will be seen that the present invention provides an erasure-precedent magnetic head which reduces crosstalk ascribable to flux picked up by an erase core from a track of a disket. This advantage is derived from a unique arrangement wherein the erase core and a read/write core are inclined relative to the longitudinal axis of the magnet head, the angles of the erase and read/write gaps to the longitudinal axis each has a different angle, and a shield plate is interposed between the two cores. Since the erase core and the read/write core are fabricated independently of each other, their angles which are different from each other can be readily set up. Furthermore, the magnetic head is easy to fabricate since the erase and read/write cores and the shield plate have only to be adhered together on their surfaces.

Various modifications will become possible for those skilled in the art after receiving the teachings of the present disclosure without departing from the scope thereof.

What is claimed is:

1. A magnetic head comprising a read/write core member having an elongate read/write gap for writing and reading data out of a track of a magnetic recording medium, and an erase core having an elongate erase gap which precedes said read/write gap to erase said track, wherein said read/write core member and said erase core member adjoin and extend parallel to each other, and each is inclined by a predetermined angle relative to a longitudinal axis of said magnetic head and each has a particular width such that said read/write gap and said erase gap associated therewith substantially overlap said track to write or read data out of said medium or to erase data on said medium.

2. A magnetic head as claimed in claim 1, wherein said read/write gap and said erase gap are inclined to said longitudinal axis by different angles from each other.

3. A magnetic head as claimed in claim 2, wherein a shield member is interposed between said read/write core member and said erase core member for magnetically shielding said cores from each other.

4. A magnetic head as claimed in claim 2, wherein said predetermined angle of said read/write core member and said erase core member relative to said longitudinal axis is neither 0 degrees nor 90 degrees.

5. A magnetic head as claimed in claim 2, wherein assuming that said read/write core member and said erase core member have respectively widths C1 and C2, the track has a width T, said predetermined angle of said read/write core member and said erase core member relative to said longitudinal axis and said track is $\phi$, and said read/write gap and said erase gap are respectively inclined to said longitudinal axis by angles $\theta 1$ and $\theta 2$, said widths C1 and C2 are expressed as:

$$C1 = \frac{T \cdot \cos \phi}{|\sin \theta 1|}$$

$$C2 = \frac{T \cdot \cos \phi}{|\sin \theta 2|}$$

6. A magnetic head as claimed in claim 1, wherein said magnetic recording medium comprises a disket.

* * * * *